United States Patent [19]

Reynolds

[11] 4,108,635

[45] Aug. 22, 1978

[54] SOLDER SKIMMINGS RECOVERY PROCESS

[75] Inventor: James E. Reynolds, Golden, Colo.

[73] Assignee: Hazen Research Inc., Golden, Colo.

[21] Appl. No.: 670,695

[22] Filed: Mar. 26, 1976

[51] Int. Cl.$^2$ .................. C22B 13/00; C22B 13/04; C01C 1/16; C01G 9/04

[52] U.S. Cl. .................. 75/24; 23/267 R; 75/78; 75/97 A; 241/20; 423/98

[58] Field of Search ............ 75/77, 78, 79, 85, 97 R, 75/97 A, 120, 121, 24; 241/19, 20, 24; 29/403; 228/34; 23/267 R; 423/98

[56] References Cited

U.S. PATENT DOCUMENTS

| | | | |
|---|---|---|---|
| 3,160,352 | 12/1964 | Mollring | 23/267 R |
| 3,675,859 | 7/1972 | Mitchell | 241/24 |
| 3,754,897 | 8/1973 | Derham et al. | 75/77 |
| 3,770,424 | 11/1973 | Floyd et al. | 75/24 |
| 3,892,563 | 7/1975 | LaPoint | 23/267 R |
| 3,905,808 | 9/1975 | Bzura | 75/101 R |

FOREIGN PATENT DOCUMENTS

757,426  9/1956  United Kingdom .................. 75/77

*Primary Examiner*—L. Dewayne Rutledge
*Assistant Examiner*—Michael L. Lewis
*Attorney, Agent, or Firm*—Sheridan, Ross, Fields & McIntosh

[57] ABSTRACT

An improvement in the method for recovering marketable values of solder, lead, and a zinc chloride-ammonium chloride solution from solder skimmings which comprises grinding the skimmings, water leaching the skimmings to dissolve the zinc chloride and ammonium chloride, screening the leach residue to recover solder from the leach slurry, separating the ammonium and zinc chloride solutions from the lead chloride in the leach slurry, and contacting the lead chloride with an alkaline flux, a reductant, and an oxygen-containing gas under heat to recover lead from the lead chloride.

6 Claims, 1 Drawing Figure

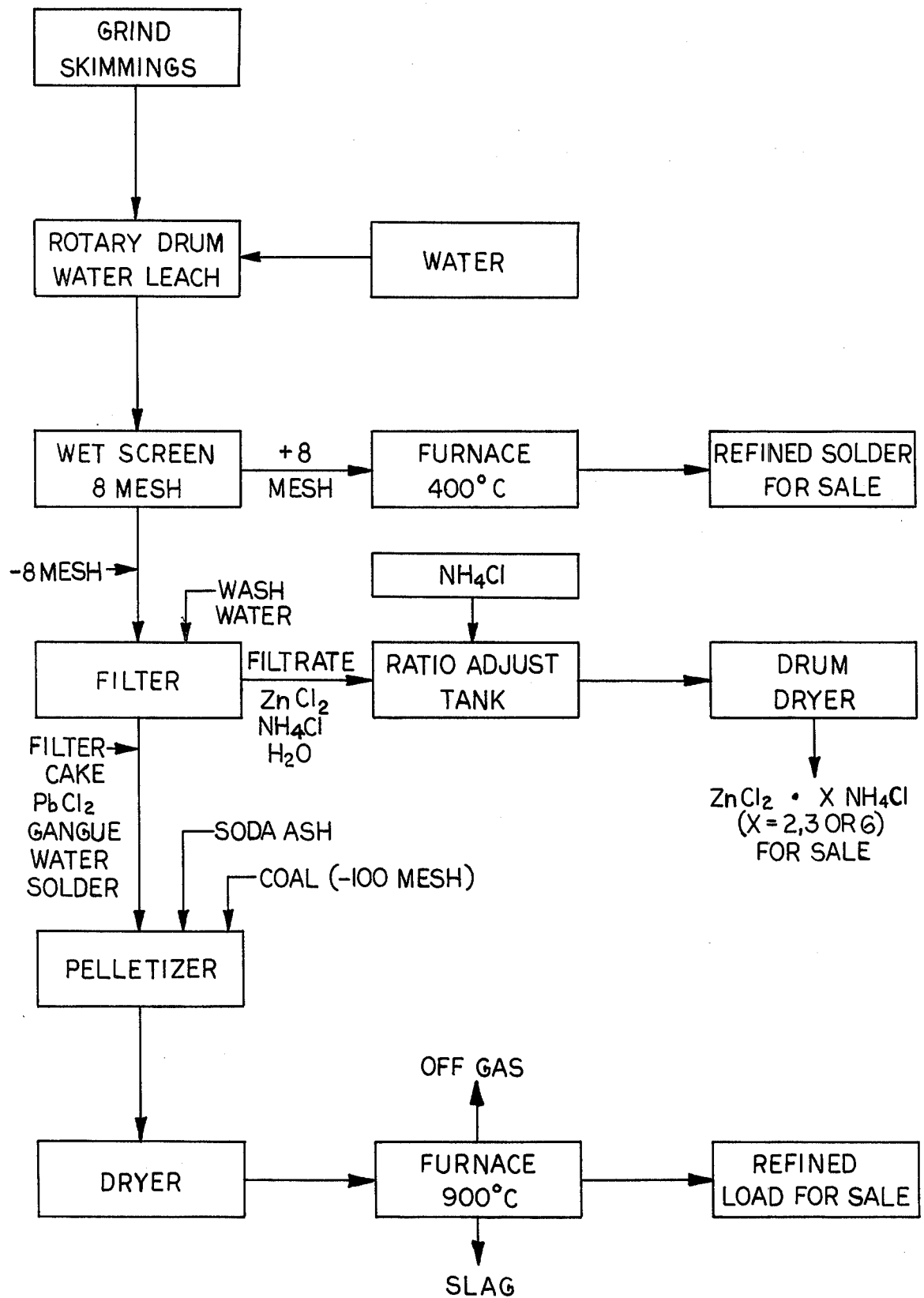

SOLDER SKIMMINGS RECOVERY PROCESS

SUMMARY OF THE INVENTION

The invention is an improved process for recovering values from solder skimmings which comprises grinding the solidified skimmings, water leaching the ground skimmings to dissolve zinc chloride and ammonium chloride away from the pieces of occluded solder and lead chloride, screening the residue from the water leach to recover the pieces of solder from the lead chloride ($PbCl_2$), and the ammonium chloride and zinc chloride solution, and contacting the lead chloride with an alkaline flux, a reductant, and an oxygen-containing gas (most preferably air) under heat to recover lead from the lead chloride.

BACKGROUND OF THE INVENTION

1. Field of the Invention

The invention is in the field of recovery of values from scrap solder and solder skimmings.

2. Description of the Prior Art

Solder baths used in can manufacturing are covered with a layer of ammonium chloride flux to prevent oxidation of the solder. Zinc chloride is added to the flux to reduce fuming of the molten ammonium chloride. Lead oxide present reacts with the chlorides to form lead chloride. In skimming off the slag which is formed as the cans are soldered some of the flux and solder is removed because of the inefficiency of the skimming procedure. The skimmings after they harden contain solder chunks and granular lead chloride in a matrix of solid ammonium chloride and zinc chloride. These skimmings are referred to herein as solder skimmings or solder bath skimmings.

The existing process for recovering solder from solder bath skimmings consists of melting the skimmings in a gas-fired furnace, tapping the molten solder and discarding the top layer of zinc chloride, ammonium chloride, and lead chloride. In the process of furnacing, an ammonium chloride fume is emitted from the stack at a level far in excess of current air pollution control limits. Air pollution correction equipment for the off-gas is costly. High energy wet venturi scrubbers will not meet present air pollution codes on plume opacity. Electrostatic precipitators are prohibitively expensive since the elements must resist corrosive attack by the acidic fumes.

In view of the disadvantages of prior processes for recovering solder from scrap solder skimmings, there is a need for a method for economically and practically recovering solder from the solder skimmings which is within acceptable air pollution control limitations.

BRIEF DESCRIPTION OF THE DRAWING

The drawing is a flow sheet which illustrates the complete process of the invention for recovering solder, a solution of zinc chloride and ammonium chloride, and lead from scrap solder skimmings.

DESCRIPTION OF THE PREFERRED EMBODIMENTS

It has been discovered that a simple water leach, after grinding the skimmings, will dissolve the zinc chloride and ammonium chloride compounds away from the pieces of occluded solder, providing the matrix is low in lead chloride. Since lead chloride is essentially water insoluble, it makes a water leach more difficult. It was found, however, that a water leach conducted in a pebble mill-rotary drum provides the additional mechanical attrition to liberate the metallic solder values. The solder is sufficiently malleable to work free occluded particles of lead chloride and permit leaching out water soluble zinc and ammonium chlorides. Solder pieces are not reduced in size to any extent, and thus it is possible to separate the values in the feed into three initial products on the basis of the difference in particle size:

1. An aqueous solution of zinc chloride and ammonium chloride.
2. Metallic nodules of solder.
3. A cake residue containing lead chloride and some silica gangue.

The zinc chloride-ammonium chloride solution can be marketed, without further processing, as an aqueous preflux for continuous strip or wire galvanizing. If required for marketing, the ratio of ammonium chloride to zinc chloride can be increased to mole ratios of either 2/1, 3/1, or 6/1, or whatever is required for sale, by addition of ammonium chloride, then dried as a flake or granular product.

The metallic nodules of solder containing some residual lead chloride, primarily as a thin surface coating, are wet screened with a screen size to provide the cleanest separation of solder and lead chloride. A screen size of 8 mesh has proved most effective. Solder nodules, analyzing about 85% Pb and 3% Sn, are refined by melting in a furnace at 400° C. The slag is mostly lead chloride which is raked off. It can be added to the residue cake in the following step. The melting point of the solder is checked and the Pb-Sn ratio adjusted by minor additions of purchased tin or lead to meet marketing specifications.

The filter cake from the screening is mostly lead chloride contaminated with silica and a small amount of solder. Since there is little or no market for lead chloride, it is best to convert the lead chloride to lead by reacting it with an alkaline flux, a reductant, and an oxygen containing gas in a furnace at a temperature preferably between about 750° C and 1100° C. Soda ash ($Na_2CO_3$) has been found to be the most effective alkaline flux although other alkaline fluxing agents, such as lime, can be used. Coal is the most effective reductant, and air the most effective oxygen containing gas. Many carbonaceous materials such as fuel oil, coke, molasses, or pitch may be substituted for coal. The result of this reaction is the formation of a fluid NaCl top layer and a bottom layer of pure molten lead. The chemical equation for the reaction is:

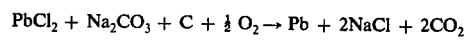

$$PbCl_2 + Na_2CO_3 + C + \tfrac{1}{2} O_2 \rightarrow Pb + 2NaCl + 2CO_2$$

The following example is illustrative of the invention but not limiting thereof.

EXAMPLE 1

One ton of a feed of solidified solder skimmings ground to about ¼-½ inch top size and containing by weight percent 20% metallic solder, 47% zinc chloride, 13% ammonium chloride, 18% lead chloride and 2% gangue was combined with 1120 pounds of water in a rotary drum and leached for about 60 minutes under agitation.

The leach slurry from the rotary drum was then screened through an 8 mesh screen to recover solder pieces from the leach slurry, yielding a +8 mesh product containing 372 pounds of solder and 66 pounds of lead chloride. The solder was melted in a furnace at 400° C with no visible emission of fumes and skimmed to remove 70 pounds of slag, with 368 pounds of solder remaining, a 92% recovery based on the solder in the feed. The lead chloride can be sent to the subsequent step for recovering lead from lead chloride.

The −8 mesh material was then filtered, with 90 pounds of water being used as wash water. A filtrate weighing 2420 pounds and containing 930 pounds of $ZnCl_2$, 242 pounds of $NH_4Cl$ and 1210 pounds of water was recovered and packaged for sale. This is a 97% recovery of these two compounds based on their content in the feed.

The filter cake, weighing 433 pounds and containing 284 pounds of lead chloride, 40 pounds of gangue, 81 pounds of water and 28 pounds of solder was then combined with 130 pounds of soda ash ($Na_2CO_3$) and 30 pounds of −100 mesh coal and pelletized, resulting in 565 pounds of green pellets. The pellets were dried with 75 pounds of water being evaporated, resulting in 490 pounds of dry pellets. These were heated to 900° C in a furnace until the reaction was complete with the production of 142 pounds of slag and a yield of 218 pounds of lead, an 84% recovery based on the lead in the lead chloride in the feed.

It is seen from the above results that the process is essentially pollution free as all chlorides are recovered as solutions and no gases are discharged into the atmosphere. The high recovery from the solder skimmings of all saleable materials of the required purity for marketing demonstrates the economic feasibility of the process.

What is claimed is:

1. A method for recovering solder, zinc chloride and ammonium chloride, and lead from solidified solder skimmings, comprising the following steps:
   (a) grinding the skimming to a small size;
   (b) water leaching the solder skimmings with violent agitation to both mechanically separate and dissolve both zinc chloride and ammonium chloride thereby freeing occluded pieces of solder and particles of lead chloride;
   (c) separating the pieces of solder from the leach slurry;
   (d) refining the reclaimed solder by heat to purify it;
   (e) filtering the leach slurry to separate ammonium chloride and zinc chloride solution and water from the lead chloride;
   (f) recovering a filter cake of predominantly lead chloride; and
   (g) recovering lead from the lead chloride.

2. The method of claim 1 in which in step (g) the lead is recovered from the lead chloride by contacting the lead chloride with an alkaline flux, a reductant, and an oxygen-containing gas.

3. The method of claim 1 in which in step (g), the lead is recovered from the lead chloride by contacting the lead with an alkaline flux, a reductant, and an oxygen-containing gas at a temperature of from about 750° C to about 1100° C.

4. The method of claim 3 in which in step (c), the pieces of solder are separated from the leach slurry by screening the leach slurry through a screen having a mesh size of about 8, lead chloride is recovered from the molten solder in step (d) and added to the lead chloride from which lead is recovered in step (g), the alkaline flux is soda ash or lime, the reductant used in step (g) is a carbon containing material, and the oxygen-containing gas is air.

5. The method of claim 1 in which in step (c), the pieces of solder are separated from the leach slurry by screening the leach slurry through a screen having a mesh size of about 8.

6. A method for dissolving in water zinc chloride and ammonium chloride from pieces of occluded solder and granular lead chloride in solder skimmings which comprises leaching said skimmings with water while violently agitating the scrap solder skimmings in a pebble mill-rotary drum to simultaneously mechanically separate occluded solder and granular lead chloride.

* * * * *